United States Patent [19]
Resch

[11] Patent Number: 5,704,234
[45] Date of Patent: Jan. 6, 1998

[54] CYLINDER LOCK INCORPORATING A SLAM RESISTANCE PAD

[75] Inventor: Dennis E. Resch, Menomonee Falls, Wis.

[73] Assignee: Strattec Security Corporation, Milwaukee, Wis.

[21] Appl. No.: 540,741

[22] Filed: Oct. 11, 1995

[51] Int. Cl.$^6$ .................................................. E05B 9/04
[52] U.S. Cl. .................... 70/371; 70/416; 70/422; 70/421; 70/DIG. 15
[58] Field of Search .................... 70/369, 370, 367, 70/416, 422, 421, DIG. 15, 252, DIG. 62, DIG. 69; 292/DIG. 56, DIG. 73

[56] References Cited

U.S. PATENT DOCUMENTS

| | | | |
|---|---|---|---|
| 1,250,959 | 12/1917 | Brown | 292/DIG. 56 |
| 1,986,676 | 1/1935 | Hurd | 70/369 |
| 2,357,004 | 8/1944 | Jacobi | 70/367 |
| 2,391,832 | 12/1945 | Johnstone | 70/367 |
| 3,722,243 | 3/1973 | Schiesterl | 70/417 |
| 4,074,548 | 2/1978 | Milton | 70/422 |
| 4,565,080 | 1/1986 | Kincaid et al. | 70/371 |
| 4,903,511 | 2/1990 | Niedzielski et al. | 70/252 |
| 5,077,994 | 1/1992 | Trull et al. | 70/371 |
| 5,121,619 | 6/1992 | Martin | 70/371 |
| 5,186,031 | 2/1993 | Janssen et al. | 70/422 |

FOREIGN PATENT DOCUMENTS

| 0269556 | 6/1988 | European Pat. Off. | 70/370 |
|---|---|---|---|

*Primary Examiner*—Darnell M. Boucher
*Attorney, Agent, or Firm*—Andrus, Sceales, Starke & Sawall

[57] ABSTRACT

A cylinder lock is provided having a sleeve rotatably receivable within the inner core of a sleeve. A cylinder retainer is slidably mounted within a cylinder retainer slot in the cylinder for radial movement therein. The cylinder retainer is movable between a first cylinder retaining position wherein the outer end of the cylinder retainer projects from the cylinder, a second retracted position wherein the outer end of the cylinder retainer is retracted within the cylinder. A slam resistance pad is mounted within the cylinder lock between the cylinder retainer and a stop surface in the sleeve such that if a thief attempts to remove the cylinder from the sleeve, the slam resistance pad is compressed between the cylinder retainer and the stop surface in the sleeve and dissipates the impact force on the cylinder retainer.

23 Claims, 1 Drawing Sheet

//U.S. Patent — Jan. 6, 1998 — 5,704,234
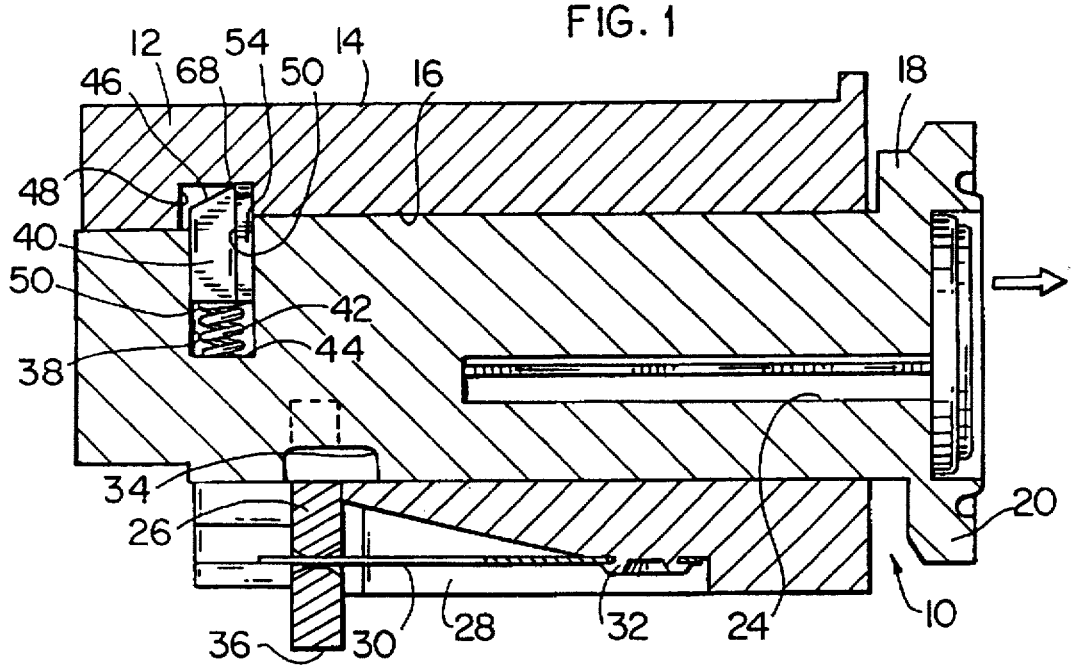
FIG. 1
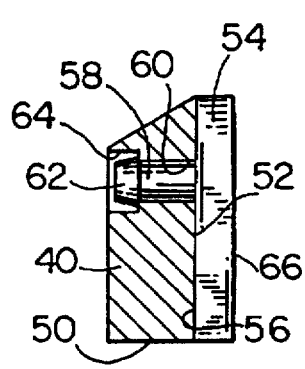
FIG. 2
FIG. 3
FIG. 4
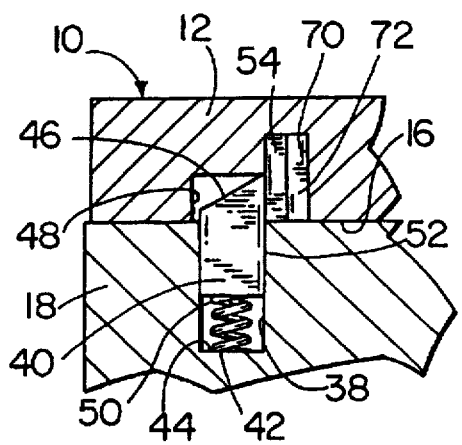
FIG. 5

CYLINDER LOCK INCORPORATING A SLAM RESISTANCE PAD

BACKGROUND AND SUMMARY OF THE INVENTION

This invention relates to cylinder locks, and in particular, to cylinder locks which incorporate a cylinder retainer to prevent the cylinder from being removed from the sleeve by the application of a pull force to the cylinder.

Over the last several years, it is become increasing desirable to improve the anti-tampering features of lock and key sets. This is particularly true with respect to automobile ignition systems where auto theft is almost developed into an art form. Skilled thieves can often "hot wire" an automobile ignition in a manner of a few seconds.

A common procedure in the theft of automobiles involves pulling the cylinder from the sleeve of the cylinder lock in order for the thief to gain access to the element controlled by the cylinder lock. In order to prevent the removal of the cylinder from the sleeve of the cylinder lock, a cylinder retainer is slidably mounted within a cylinder retainer slot in the cylinder for radial movement therein. The cylinder retainer is movable between a first cylinder retaining position wherein the outer end of the cylinder retainer projects from the cylinder and into a recessed channel in the sleeve, and a second retracted position wherein the outer end of the cylinder retainer is retracted within the cylinder. Means are provided for biasing the cylinder retainer radially outward toward the cylinder retaining position.

In order to properly remove a cylinder from a sleeve of the cylinder lock, it is necessary to retract the cylinder retainer into the cylinder retainer slot in order to clear the sleeve. Typically this cannot be done without the key after the lock is properly installed in an operating system such as the steering column of an automobile. Therefore, unless the cylinder is removed in the proper manner, with the mated key in place, the cylinder can only be removed from the sleeve by applying a pull force to the cylinder sufficient to overcome the retention force of the cylinder retainer.

Cylinder retainers are often die cast and hence, are prone to shear in response to large forces exerted thereon. As a result, when a pull impact is applied to the cylinder to remove the cylinder from the sleeve, die cast cylinder retainers often shear in response to the force. This, in turn, allows the cylinder to be removed from the sleeve of the cylinder lock such that a thief will be allowed access to the element controlled by the cylinder lock.

Attempts have been made to manufacture the cylinder retainer from a harder substance, such as steel, to prevent the shearing of the cylinder retainer in response to an impact force on the cylinder. However, the use of materials such as steel are cost prohibitive.

In order to reduce cost, powdered metal cylinder retainers were developed. However, powdered metal cylinder retainers are prone to shatter in response to large forces exerted thereon. As a result, when an impact force is applied to the cylinder to remove the cylinder from the sleeve, powdered metal cylinder retainers often shatter in response to the force. This, in turn, allows the cylinder to be removed from the sleeve of the cylinder lock such that a thief would be allowed access to the element controlled by the cylinder lock. Therefore, it is highly desirable to improve the retention force of present, die cast and powdered metal cylinder retainers.

Therefore, it is a primary object and feature of the present invention to provide a cylinder lock which demands an increased impact force to remove the cylinder from the sleeve without a mated key in the cylinder.

It is a further object and feature of the present invention to provide a cylinder lock having a cylinder retainer and a slam resistance pad mounted thereto for dissipating the forces on the cylinder retainer in response to an impact force applied to the cylinder in order to remove the cylinder from the sleeve.

It is a still further object and feature of the present invention to provide a cylinder lock which provides added resistance to an impact force applied to the cylinder to remove the cylinder from the sleeve.

A cylinder lock is provided having a sleeve with an internal surface defining an inner core in the sleeve. The internal surface includes a recess channel therein.

A cylinder is rotatably received within the inner core of the sleeve. The cylinder defines an external cylinder surface, a longitudinal axis, a key slot for slidably receiving a mated key therein. The cylinder further includes a cylinder retainer slot extending radially with respect to the axis. The cylinder retainer slot includes an opened outer end which opens to the external cylinder surface.

A cylinder retainer is slidably mounted within the cylinder retainer slot for radial movement therein. The cylinder retainer is movable between a first cylinder retaining position wherein the outer end of the cylinder retainer projects from the cylinder and into the recessed channel in the sleeve, and a second retracted position wherein the outer end of the cylinder retainer is retracted within the cylinder. Means are provided for biasing the cylinder retainer radially outward toward the cylinder retaining position.

A slam resistance pad is positioned between a stop surface in the recessed channel in the sleeve and the cylinder retainer. In a first embodiment, the slam resistant pad is mounted to the cylinder retainer such that when an impact force is exerted on the cylinder to remove the cylinder from the inner core of the sleeve, the slam resistance pad engages the stop surface and dissipates the force on the cylinder retainer.

In an alternate embodiment, the slam resistance pad is mounted to the stop surface in the recessed channel of the sleeve. In response to an impact force exerted on the cylinder to remove the cylinder from the inner core of the sleeve, the cylinder retainer engages the slam resistance pad mounted to the stop surface. The slam resistance pad as with the first embodiment, dissipates the forces on the cylinder retainer.

Due to the dissipation of forces on the cylinder retainer by the slam resistance pad, the cylinder retainer can accommodate larger and repeated impact forces on the cylinder before failing. As a result, the cylinder retainer will prevent the cylinder from being removed from the inner core of the sleeve.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a side view, and cross section, of a cylinder lock incorporating a slam pull resistance pad of the present invention;

FIG. 2 is an exploded, isometric view of a cylinder retainer and the slam pull resistance of the present invention;

FIG. 3 is a side view, in section, of a cylinder retainer having a second embodiment of the slam pull resistance of the present invention attached thereto;

FIG. 4 is a side view, in cross section, showing a cylinder retainer having a third embodiment of the slam pull resistance pad of the present invention attached thereto; and FIG. 5 is a side view, in cross section, showing a portion of a cylinder lock incorporating a fourth embodiment of the slam pull resistance pad of the present invention.

DETAILED DESCRIPTION OF THE PREFERRED EMBODIMENT

Referring to FIG. 1, a cylinder lock of the present invention is generally designated by the reference numeral 10. Cylinder lock 10 includes a sleeve 12 having an outer peripheral surface 14 and an inner core 16 for receiving a rotatable cylinder 18 in a manner well known to those skilled in the art. As is typical, the sleeve and the cylinder are co-axial. The cylinder 18 terminates in a head 20 which encloses the open end of sleeve 12, when the cylinder 18 is inserted in the sleeve 12 as shown in FIG. 1. The cylinder 18 includes a key slot 24 for receiving a mated key therein. In typical use, the key includes a notch edge (not shown) for engaging a plurality of tumblers (not shown) contained in the cylinder 18, wherein insertion of a properly mated key permits rotation of the lock cylinder 18 within the sleeve 12 to unlock or enable a controlled element in a well known manner.

Sleeve 12 further includes a first retainer 26 housed in the recess 28 provided in the outer perimeter 14 of sleeve 12. The retainer 26 is mounted on a resilient biasing member such as wire spring 30, which is secured to the sleeve by suitable means, such as swaging, as shown at 32. A recess channel 34 is provided in the cylinder 18 to permit depression of the first retainer 26 into its recessed position, as shown in phantom in FIG. 1, such that the outer end 36 of the first retainer 26 is flush with the outer peripheral surface 14 of sleeve 12. This permits the assembled sleeve and cylinder lock to be installed in a suitable, mated receptacle, after which the wire spring 30 urges the retainer 26 into its extended position, shown in FIG. 1, for retaining the cylinder lock 10 in the installation.

Cylinder 18 includes an integral recess 38 for receiving a cylinder retainer 40 therein. Cylinder retainer 40 is mounted on a biasing means such as a coil compression spring 42 which engages base surface 44 in recess 38 of cylinder 18. The recess 38 in cylinder 18 permits cylinder retainer 40 to be depressed into a recessed position, fully within recess 38 in cylinder 18. This, in turn, allows cylinder 18 to be inserted into sleeve 12, as previously described. Typically, the cylinder retainer 40 includes a beveled upper surface 46 for facilitating axial movement of the cylinder 18 into sleeve 12.

Cylinder retainer 40 includes a spring engaging surface 50 which engages coil compression spring 42 when cylinder retainer 40 is received within recess 38. When the cylinder 18 is properly inserted in the sleeve 12, coil compression spring 42 urges the cylinder retainer 40 into a recessed channel 48 provided in the inner core 16 of sleeve 12, wherein the cylinder retainer 40 protrudes radially outwardly from the outer perimeter of cylinder 18. This, in turn, retains cylinder 18 within the inner core 16 of sleeve 12.

In order to properly remove the cylinder 18 from sleeve 12, it is necessary to retract cylinder retainer 40 into recess 38 in order to clear sleeve 12 and allow axial movement of cylinder 18 from sleeve 12. In the alternative, cylinder 18 may be rotated such that the cylinder retainer 40 is aligned with a longitudinal slot (not shown) in sleeve 12. This, in turn, also allows for axial movement of the cylinder 18 from sleeve 12.

Typically, the cylinder retainer 40 cannot be retracted into recess 38 after cylinder lock 10 is properly installed in an operating system such as the steering column of an automobile. As such, unless cylinder lock 18 is rotated with a proper mated key such that cylinder retainer 40 is aligned with the longitudinal slot, cylinder 18 can only be removed from sleeve 12 by applying an impact force to cylinder 18 sufficient to overcome the retention force of cylinder retainer 40 in the recess channel 48 in the inner core 16 of sleeve 12.

Cylinder retainer 40 further includes a forward surface 52 having a pad 54 made of rubber or the like mounted thereto. As hereinafter described, slam resistance pad 54 absorbs energy or dissipates force on cylinder retainer 40 when an impact force is exerted on cylinder 18. Referring to FIG. 2, in the first embodiment, slam resistance pad 54 includes a rearward surface 56 which is mounted to forward surface 52 of cylinder retainer 40 by means of glue, epoxy or the like.

Referring to FIG. 3, in an alternate embodiment, slam resistance pad 54 includes a neck 58 extending from its rearward surface 56. An aperture 60 is provided in cylinder retainer 40 such that neck 58 may be press fit into aperture 60 so as to retain slam resistance pad 54 on cylinder retainer 40 such that the rearward surface 56 of slam resistance pad 54 abuts the forward surface 52 of cylinder retainer 40. In the preferred embodiment, cylinder retainer 40 is designed such that when cylinder retainer 40 is biased to protrude radially outwardly from the outer perimeter of cylinder 15, aperture 60 in cylinder retainer is not in axial alignment with the outer perimeter of cylinder 18 with inner core 16, wherein the shear strength of cylinder retainer 40 would be compromised.

Referring to FIG. 4, a still further embodiment of the present invention is provided wherein an enlarged head 62 is formed on the end of neck 58 extending from the rearward surface 56 of slam resistance pad 54. Aperture 60 in cylinder retainer 40 communicates with a cavity 64 in cylinder retainer 40 which is co-axial with aperture 60. Cavity 64 has a larger diameter than aperture 60 so as to accommodate enlarged head 62 formed on the end of neck 58.

To retain slam resistance pad 54 on cylinder retainer 40, neck 58 is press fit into aperture 60 such that head 62 is received in cavity 64 of cylinder retainer 40 and the rearward surface 56 of slam resistance pad 54 abuts the forward surface 52 of cylinder retainer 40. As seen in FIG. 4, head 62 in cavity 64 prevents pad 54 from detaching from cylinder retainer 40.

As previously described, in order to gain access to the control element within an operating system such as a steering column of an automobile, a skilled thief often attempts to remove the cylinder 18 from the inner core 16 of sleeve 12. Without a mated key cylinder 18 can only be removed from sleeve 12 by applying an impact force to the cylinder 18 sufficient to overcome the retention force of cylinder retainer 40. As the impact force is placed on cylinder 18 so as to urge axial movement of cylinder 18 from sleeve 12, the forward surface 66 of slam resistance pad 54 engages sidewall 68 within recess 48 of sleeve 12. Slam resistance pad 54 dissipates the impact force exerted on cylinder retainer 40. This, in turn, increases the amount of retention force of cylinder retainer 40.

Referring to FIG. 5, an alternate embodiment of cylinder lock 10 is shown incorporating a slam pull resistance pad 54. As previously described, cylinder 18 includes an integral recess 38 in cylinder retainer 40 which is mounted on a biasing means such as a coil compression spring 42 which engages base surface 44 in recess 38 of cylinder 18. Cylinder retainer 40 includes a spring engaging surface 50 which engages coil compression spring 42 when cylinder retainer 40 is received within recess 38.

When cylinder 18 is properly inserted in sleeve 12, coil compression spring 42 urges cylinder retainer 40 into recess channel 48 provided in the inner core 16 of sleeve 12, wherein the cylinder retainer 40 protrudes radially outward from the outer perimeter of cylinder 18.

A second recess channel 70 is provided in inner core 16 of sleeve 12 wherein the second recess channel 70 communicates with the first recess channel 48 in sleeve 12. A plate 72 is mounted within recessed channel 70 along with slam resistance pad 54.

When an impact force is applied on cylinder 18 so as to urge axial movement of cylinder 18 from sleeve 12, the portion of the forward surface 52 of cylinder retainer 40 which extends radially outwardly from the outer perimeter of cylinder 18 engages slam resistance pad 54. As previously described, slam resistance pad 54 dissipates the force exerted on cylinder retainer 40 which, in turn, increases the amount of retention force of cylinder retainer 40. By increasing the retention force of cylinder retainer 40, it becomes more difficult, if not impossible, for a thief to remove cylinder 18 from the inner core 16 of sleeve 12.

Various modes of carrying out the invention are contemplated as being within the scope of the following claims particularly pointing out and distinctly claiming the subject matter regarded as the invention.

I claim:

1. A cylinder lock, comprising:

a sleeve having an internal surface defining an inner core in the sleeve, the internal surface including a recessed channel therein;

a cylinder rotatably receivable within the inner core of the sleeve, the cylinder defining an external cylinder surface, a longitudinal axis, and a key slot for slidably receiving a key therein, the cylinder further including a cylinder retainer slot extending radially with respect to the axis, the cylinder retainer slot having an opened outer end which opens to the external cylinder surface;

a cylinder retainer slidably mounted within the cylinder retainer slot for radial movement therein, the cylinder retainer includes an outer end, and is movable between a first cylinder retaining position wherein the outer end of the cylinder retainer projects from the cylinder into the recessed channel in the sleeve, and a second retracted position wherein the outer end of the cylinder retainer is retracted within the cylinder;

means for biasing the cylinder retainer radially outward toward the cylinder retaining position; and a slam resistance impact energy absorbing pad mounted to the cylinder retainer, the slam resistance pad compressing against the sleeve when an impact force is exerted on the cylinders in an attempt to remove the cylinder from the inner core of the sleeve without a mated key in the key slot.

2. The cylinder lock of claim 1 further comprising a means for mounting the slam resistance pad to the cylinder retainer.

3. The cylinder lock of claim 2 wherein the means for mounting the slam resistance pad to the cylinder retainer includes glue.

4. The cylinder lock of claim 2 wherein the cylinder retainer includes an aperture extending therethrough.

5. The cylinder lock of claim 4 wherein the means for mounting the slam resistance pad to the cylinder retainer includes a neck extending laterally from the slam resistance pad and dimensioned for receipt in the aperture in the cylinder retainer.

6. A device for preventing the axial removal of a cylinder from a cylinder lock without a mated key, the cylinder lock extending along a longitudinal axis and including a sleeve having internal surface defining an inner core, the internal surface of the sleeve including a recessed channel therein, the cylinder lock further including a rotatable cylinder adapted to be longitudinally inserted into the inner core of the sleeve, the cylinder including a key way disposed along the axis for slidably receiving the mated key therein and a cylinder retainer slot extending radially with respect to the axis, the cylinder rotatable with the mated key between the first locked position and a second unlocked position, the device comprising:

a cylinder retainer slidably mounted within the cylinder retainer slot for radial movement therein, the cylinder retainer includes a radially outer end, and is movable between a first cylinder retaining position wherein the outer end of the cylinder retainer projects from cylinder and into the recessed channel in the internal surface of the sleeve, and a second non-retaining position wherein the outer end of the cylinder retainer is retracted within the cylinder;

means for biasing the cylinder retainer radially outward toward the cylinder retaining position; and elastomer means for absorbing impact energy to the cylinder retainer in response to an attempt to axially remove the cylinder from the sleeve of the cylinder lock by an impact force without the mated key in the key slot.

7. The device of claim 6 wherein the means for biasing the cylinder retainer includes a coil compression spring positioned in the cylinder retainer slot.

8. The device of claim 6 wherein the means for preventing deformation of the cylinder retainer includes a slam resistance pad positioned in the recessed channel when the cylinder retainer is in the cylinder retaining position.

9. The device of claim 8 wherein the slam resistance pad is mounted to the cylinder retainer.

10. The device of claim 8 wherein the cylinder retainer includes an aperture extending therethrough.

11. The device of claim 10 wherein the slam resistance pad includes a neck extending laterally therefrom, the neck adapted for receipt in the aperture in the cylinder retainer.

12. A cylinder lock having a forward and rearward end, comprising:

a sleeve having an internal surface defining an inner core in the sleeve;

a cylinder rotatably receivable within the inner core of the sleeve, the cylinder defining an external cylinder surface, a longitudinal axis, and a key slot for slidably receiving a key therein, the cylinder further including a cylinder retainer slot extending radially with respect to the axis, the cylinder retainer slot having an opened outer end which opens to the external cylinder surface;

a cylinder retainer slidably mounted within the cylinder retainer slot for radial movement therein, the cylinder retainer includes a outer end and is movable between a first cylinder retaining position wherein the outer end of the cylinder retainer projects from the cylinder and a second retracted position wherein the outer end of the cylinder retainer is retracted within the cylinder;

means for biasing the cylinder retainer radially outward toward the cylinder regaining position;

a stop surface formed along the internal surface of the sleeve, the stop surface positioned forwardly of the cylinder retainer when the cylinder is received within the sleeve; and an elastomeric slam resistance impact energy absorbing pad positioned between the stop surface and the cylinder retainer.

13. The cylinder lock of claim 12 further comprising a means for mounting the slam resistance pad to the cylinder retainer.

14. The cylinder lock of claim 13 wherein the means for mounting the slam resistance pad to the cylinder retainer includes glue.

15. The cylinder lock of claim 13 wherein the cylinder retainer includes an aperture extending therethrough.

16. The cylinder lock of claim 15 wherein the means for mounting the slam resistance pad to the cylinder retainer includes a neck extending laterally from the slam resistance pad and dimensioned for receipt in the aperture in the cylinder retainer.

17. The cylinder lock of claim 12 wherein the slam resistance pad is mounted to a stop surface, the cylinder retainer engaging the slam resistance pad in response to an impact force exerted on the cylinder to slide the cylinder forwardly in the inner core of the sleeve.

18. A cylinder lock having a forward end and a rearward end, comprising:

a sleeve having an internal surface defining an inner core in the sleeve, a cylinder rotatably receivable within the inner core of the sleeve, the cylinder defining an external cylinder surface, a longitudinal axis, and a key slot for slidably receiving a mated key therein, the cylinder rotatable with the mated key between a first unlocked position and a second locked position, a cylinder retainer extending from the cylinder, a stop surface formed in the sleeve forwardly of the cylinder retainer; and a slam resistance impact energy absorbing pad positioned between the cylinder retainer and the stop surface such that the slam resistance pad is compressed between the cylinder retainer and the stop surface in response to an impact force exerted on the cylinder to slide the cylinder forwardly in the sleeve in order to remove the cylinder from the inner core of the sleeve without a mated key in the key slot.

19. The cylinder lock of claim 18 further comprising a means for mounting the slam resistance pad to the cylinder retainer.

20. The cylinder lock of claim 19 wherein the means for mounting the slam resistance pad to the cylinder retainer includes glue.

21. The cylinder lock of claim 19 wherein the cylinder retainer includes an aperture extending therethrough.

22. The cylinder lock of claim 21 wherein the means for mounting the slam resistance pad to the cylinder retainer includes a neck extending laterally from the slam resistance pad and dimensioned for receipt in the aperture in the cylinder retainer.

23. The cylinder lock of claim 18 wherein the slam resistance pad is mounted to the stop surface, the cylinder retainer engaging the slam resistance pad in response to the impact force exerted on the cylinder to slide the cylinder forwardly in the sleeve.

* * * * *